(12) United States Patent
Jordil et al.

(10) Patent No.: US 7,779,553 B2
(45) Date of Patent: Aug. 24, 2010

(54) OSCILLATING SCANNING PROBE WITH CONSTANT CONTACT FORCE

(75) Inventors: Pascal Jordil, Ecotaux (CH); Bo Pettersson, London (GB); Siercks Knut, St. Gallen (CH)

(73) Assignee: Hexagon Metrology AB, Nacka Strand (SE)

( * ) Notice: Subject to any disclaimer, the term of this patent is extended or adjusted under 35 U.S.C. 154(b) by 121 days.

(21) Appl. No.: 12/049,757

(22) Filed: Mar. 17, 2008

(65) Prior Publication Data
US 2008/0249737 A1    Oct. 9, 2008

(30) Foreign Application Priority Data
Apr. 3, 2007    (EP) .................................. 07105559

(51) Int. Cl.
*G01B 5/012*    (2006.01)
*G01B 7/012*    (2006.01)
(52) U.S. Cl. ....................................................... 33/558
(58) Field of Classification Search .................... 33/558
See application file for complete search history.

(56) References Cited

U.S. PATENT DOCUMENTS

| | | | | |
|---|---|---|---|---|
| 5,189,806 A | * | 3/1993 | McMurtry et al. | 33/503 |
| 5,212,646 A | | 5/1993 | McMurtry | |
| 5,465,496 A | * | 11/1995 | Axon | 33/522 |
| 5,966,681 A | | 10/1999 | Bernhardt et al. | |
| 6,158,136 A | * | 12/2000 | Gotz et al. | 33/503 |
| 6,546,640 B2 | * | 4/2003 | Okada et al. | 33/503 |
| 6,546,643 B2 | * | 4/2003 | Lotze et al. | 33/559 |
| 6,854,193 B2 | * | 2/2005 | Lotze | 33/502 |
| 7,293,365 B2 | * | 11/2007 | McMurtry et al. | 33/556 |
| 7,533,574 B2 | * | 5/2009 | McMurtry et al. | 73/763 |
| 7,543,393 B2 | * | 6/2009 | McMurtry et al. | 33/502 |
| 2008/0235969 A1 | * | 10/2008 | Jordil et al. | 33/503 |
| 2009/0025244 A1 | * | 1/2009 | Jonas et al. | 33/559 |
| 2009/0030648 A1 | * | 1/2009 | Hunter et al. | 702/152 |

FOREIGN PATENT DOCUMENTS

EP    0402440 A    12/1990
EP    1503174 A1    2/2005

OTHER PUBLICATIONS

International Search Report dated Feb. 7, 2008.

* cited by examiner

*Primary Examiner*—Christopher W Fulton
(74) *Attorney, Agent, or Firm*—Pearne & Gordon LLP

(57) ABSTRACT

A method for scanning a surface of a workpiece using a scanning probe 2 mounted on a support 3 on a coordinate measuring machine 4. The support contains drive means 5, 7 for actuating the movement of the scanning probe 2 relatively to the support 3. The method further involves detecting means 9 to measure a contact force F applied between the tip 10 of the probe and the surface 1, control means 13 coupled to the drive means, and memory means 14 for storing theoretical profiles 19 and coordinates 20 of the surface. This method is characterized by the fact that the control means 13 adjust the actuation of the drive means 5, 7 along a scanning path 18 in order to maintain the contact force 11 within the defined range of values 15 during the whole scanning operation along the scanning path 18.

12 Claims, 4 Drawing Sheets

OSCILLATING SCANNING PROBE WITH CONSTANT CONTACT FORCE

REFERENCE DATA

The present invention claims priority from European Patent Application N. 2007EP-105559, filed on Apr. 3, 2007.

FIELD OF THE INVENTION

The present invention concerns a method for scanning the surface of a workpiece and a related apparatus.

DESCRIPTION OF RELATED ART

Numerous methods for scanning are known, in which a mechanical probe is fixed on a machine spindle which traverses the surface of a workpiece in straight lines over each possible direction (X, Y, Z). After each line is completed the machine spindle moves the probe to a new position displaced from the completed line and repeats the movement along a parallel line.

One major drawback of such methods known from the art is that they are relatively slow since the whole machine needs to be moved backwards and forwards while covering the whole scanning area of the surface. Furthermore, the accelerations and decelerations of the machine can introduce inaccuracies in the measurement process because of the strong inertia forces due to the heavy weight of the pieces in charge of positioning the surface detecting device. As a result, some pieces can be bent when the deflection forces applied are too high, and the measurement results are flawed.

In order to compensate for this drawback and achieve a better precision, acceleration compensated scanning probes have been introduced, like in EP1503174. The scanning probe disclosed in this patent includes a measurement stylus supported by elastic members, a force detector measuring the contact force between the measurement stylus and a surface of the workpiece. A contacting force adjusting mechanism based on a counterweight system allows to remove the inertia effects and to keep the contacting force at a predetermined low level for rectilinear movements.

Another scanning method, which is disclosed by EP0402440, allows for additional degrees of freedom in rotation on top of the linear movements according to the conventional (x,y,z) axes. The probe consists of a stylus that is mounted on a head of a measuring machine, whereby the head includes shafts that can rotate about two orthogonal axes. The stylus can be positioned angularly about the two axes, while the head is positioned by the machine in any position within its operating field. This way, the scanning can be carried out more efficiently along curved paths at a relatively constant speed, while the inertia effects are minimized thanks to the light weight of the stylus. The orientation of the stylus can take any direction so that the tip keeps the contact with the surface to be scanned. Furthermore, the shafts are driven by motors that can be geared to a constant torque mode to apply a contact force between the tip of the stylus and the surface scanned, or in a positioning mode to produce the oscillatory movements transversally to the path direction of the head.

Nevertheless, there is no method disclosed in the prior art that would allow to scan efficiently a complex surface whose form spans in the three dimensions of space, whereby the scanning would be done with non rectilinear movements and the force applied to the surface would yet still be kept constant or within a predefined range. In order to achieve this, other corrections need to be taken into account to adjust the contact force so that the bending of the stylus is kept minimal and the fine precision in the measurement is always guaranteed irrespective of the surface profile.

BRIEF SUMMARY OF THE INVENTION

According to the invention, these aims are achieved by a method by a method for scanning a surface of a workpiece using a scanning probe mounted on a support on a coordinate measuring machine (CMM), said support containing drive means for actuating the movement of said scanning probe relative to said support, control means coupled to the drive means, and memory means for storing theoretical profiles and coordinates of said surface, said method comprising the steps of:

(i) determining a first range of values for said contact force applied between the tip of said scanning probe and said surface;

(ii) operating said drive means to position said tip in contact with said surface;

(iii) operating said coordinate measuring machine to move the support along a determined trajectory; and (iv) operating said drive actuators to produce, simultaneously with the relative movement of the support with respect to the surface, movements of said scanning probe relative to the support;

whereby said control means adjust the actuation of the drive means along a scanning path in order to maintain said contact force within said first range of values during the whole scanning operation along said scanning path.

According to this method, the scanning can be performed in with a greater scanning flexibility and accuracy when the surfaces' forms are unusual or complex in three dimensions. Indeed, the adjustment of the contact force according to the surface profile prevents the bending of the stylus. In a preferred embodiment of the invention, when the adjustment cannot constrain the contact force within a predefined boundary value, further corrections can be made. The cinematic effects due to inertia forces can be also be considered for the adjustment of the contact force.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
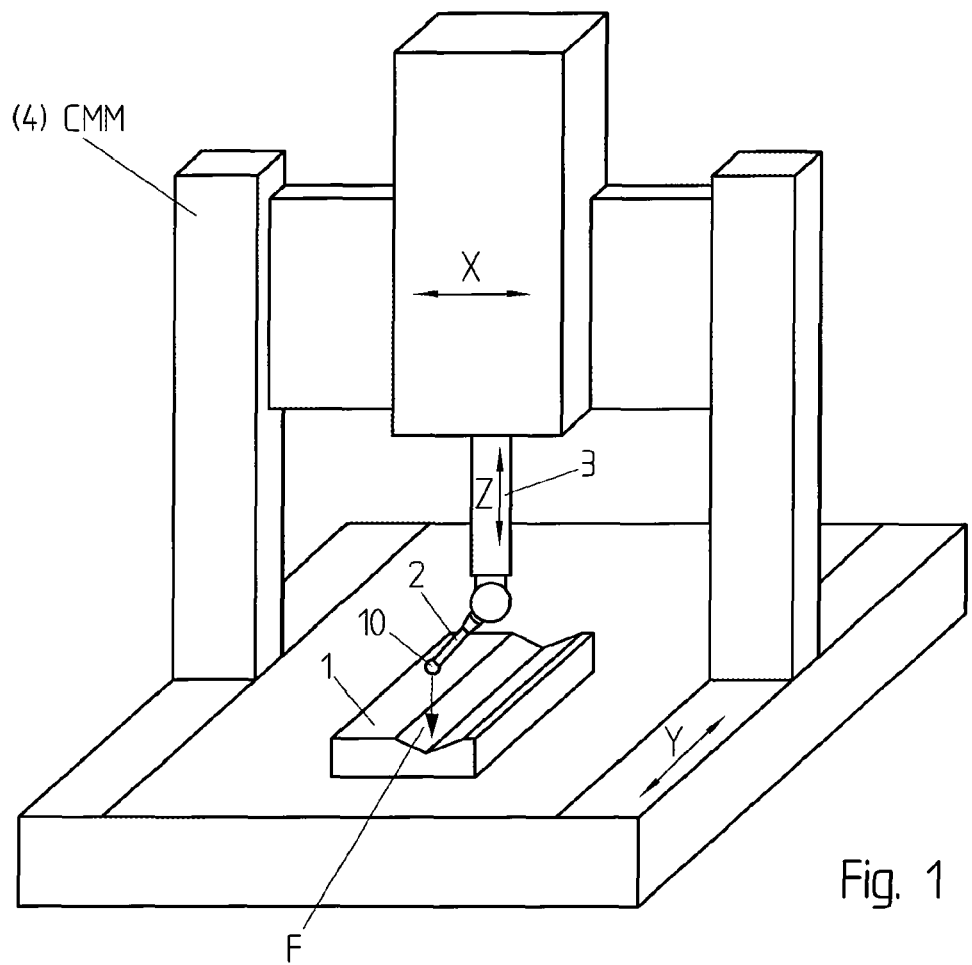
FIG. 1 shows a side view of the scanning apparatus.

A coordinate measuring machine, also known as CMM 4, is disclosed in FIG. 1 according to a preferred embodiment of the invention, where the support 3 can be moved in any linear direction (X, Y, Z), and the scanning probe 2 is attached to the support 3 while having two degrees of freedom in rotation with respect to the support 3. In this example, the axes for the rotation are the axis Z and Y, but other combinations of axes could be considered (e.g. X and Y). The tip of the probe 10, preferably spherical, is in contact with the surface 1 that is supposed to be scanned. The contact force F between the tip of the probe 10 and the surface to scan 1 is defined as the opposite of the reaction applied by the surface on the probe tip 10. This contact force F is hence normal to the plane tangent to the point of contact with the surface 1; in other words, the contact force always acts normally on the surface 1.

Figure 2:
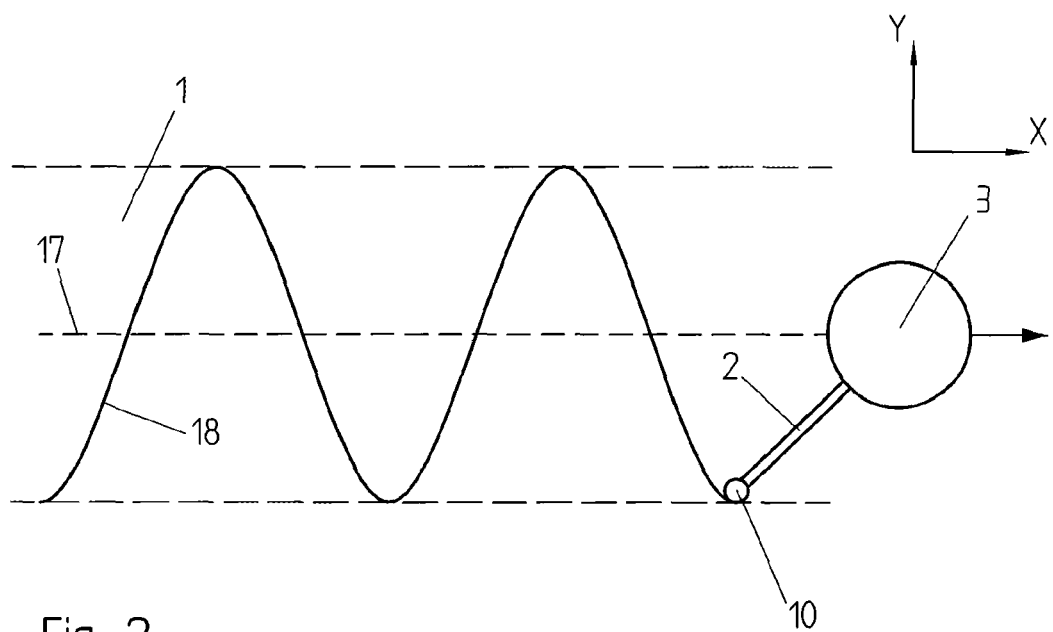
FIG. 2 shows a top view from the support and the probe moving along the scanning path.

FIG. 2 shows a potential scanning path projected on the plane (x,y). The surface to scan 1 is represented by the dashed surface; it can be comprised within the plane (x,y) or span within the three dimensions of space (x,y,z). The trajectory 17 of the support 3 is the rectilinear dotted line, which can point in any direction. In a preferred embodiment of the invention, the support 3 will consist in a Galilean reference system, i.e. moving at constant speed, thereby involving no forces of inertia. The weight of the stylus 2 making up the scanning probe is chosen as light as possible in order to minimize the forces of inertia applied to the tip of the probe 10. The intrinsic movements of the probe combined with the movement of the support 3 along the trajectory 17 determine the scanning path 18 that is followed by the tip of the probe 10. Although FIG. 2 only shows the projection of this path in two dimensions, this path is not confined to a plane and can also span the three dimensions of space.

Figure 3:
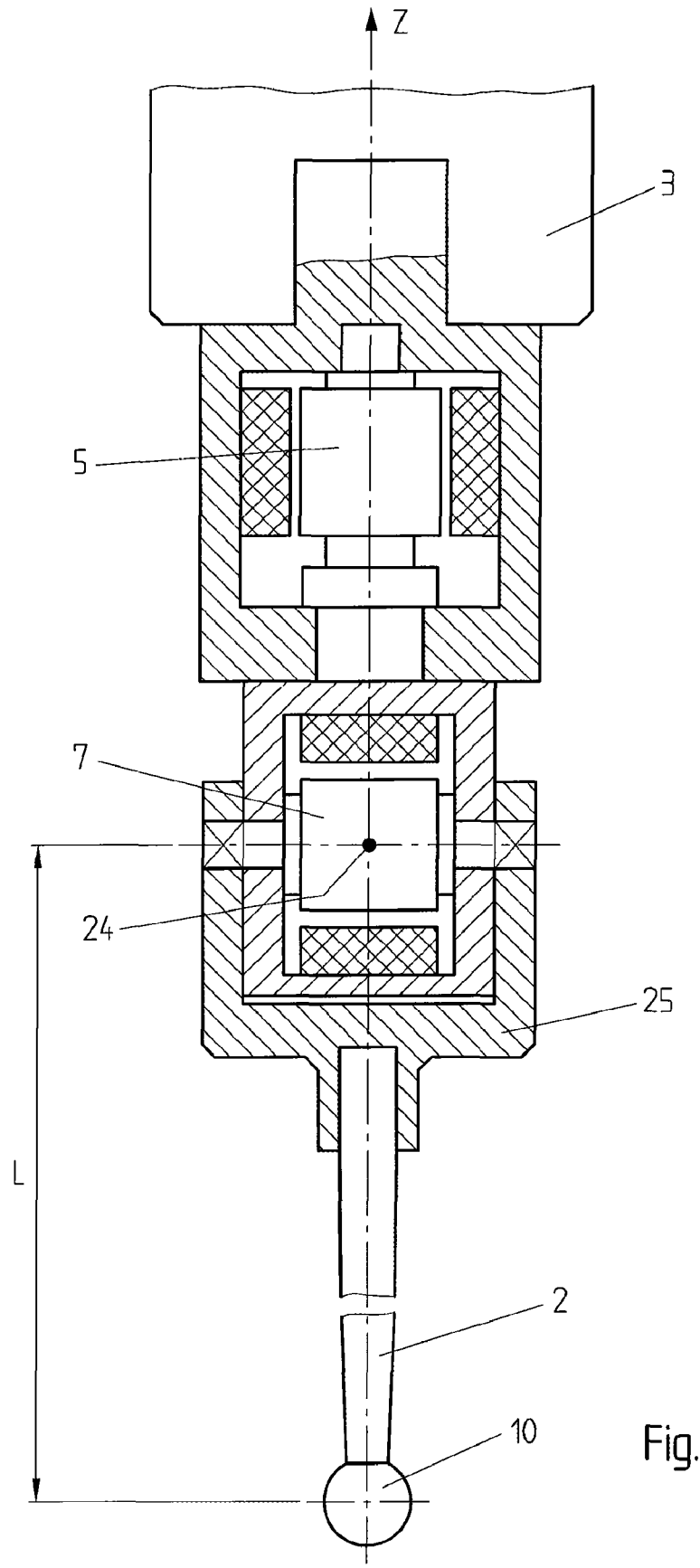
FIG. 3 is a section showing the mounting of the probe.

FIG. 3 is a section showing the mounting of the probe 2 on the support 3 and how the movements are actuated by the drive means 5, 7. The first drive means 5 is a rotor actuating a central shaft along the axis Z, preferably an electric motor. A probe head 25 fits onto the bottom of the shaft, thereby fixing the probe 2 and transmitting the rotational movements to the probe 2. The probe head 25 is designed so that the probe 2 can also freely rotate around another axis, whereby this second axis is orthogonal to the first axis (Z in this example) but its direction in the plane depends on the position of the central shaft. The probe is actuated in rotation around this axis thanks to other drive means 7, which are preferably also electric motors. The intersection of the two axes is materialized by the point 24. This point 24 is the centre of both rotational movements and represents the centre of the Galilean reference system of the support 3 in a preferred embodiment of the invention. The length of the probe L allows to determine the position of the contact point between the tip of the probe 13 and the intersection of the two axes 24, and thus in turn to derive the absolute coordinates of the contact point 20, since the coordinates of the point 24 along the trajectory 17 are known.

Figure 4:
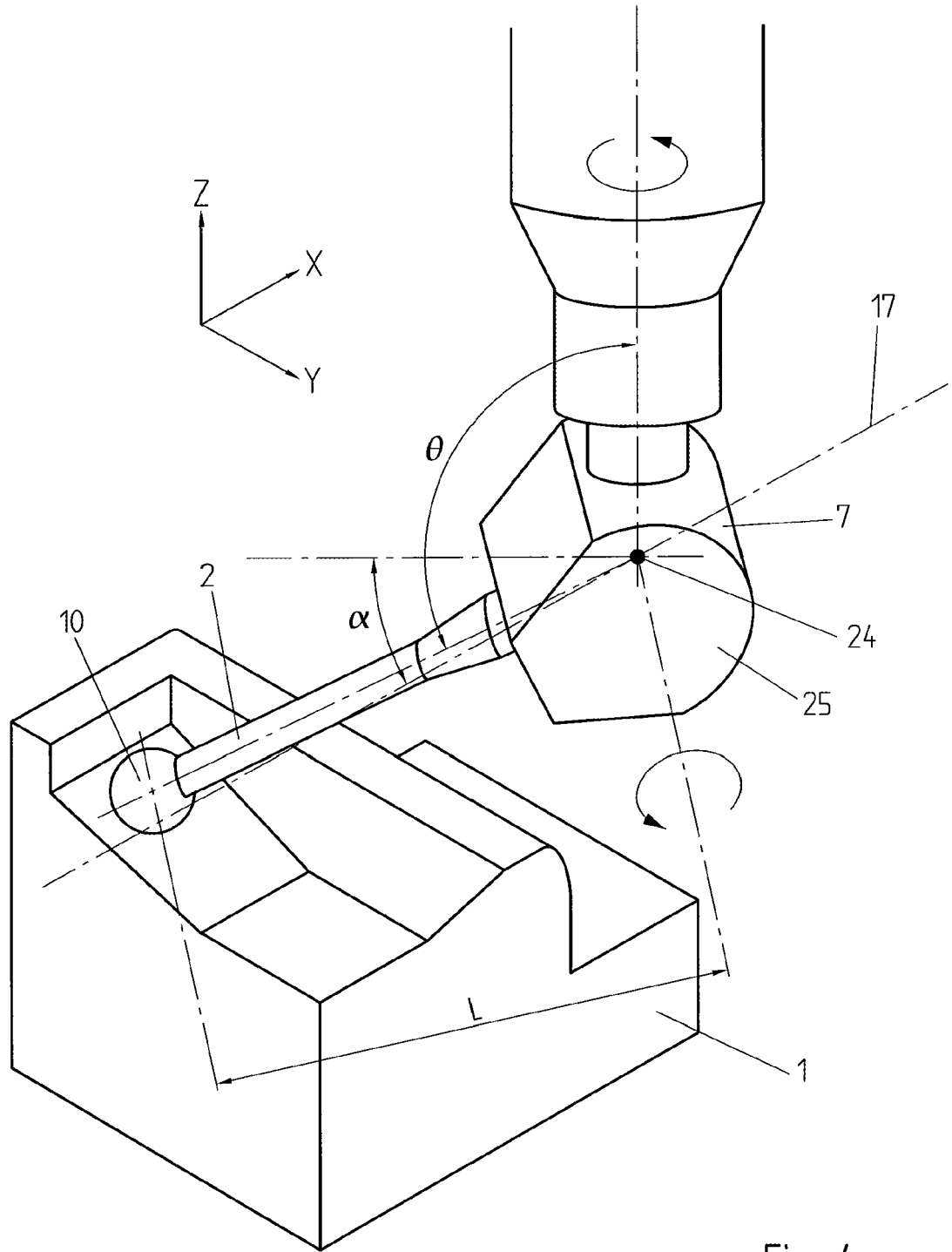
FIG. 4 shows a 3D view of the scanning probe.

The absolute coordinates of the point of the surface touched by the probe tip 20 are determined from the linear position of the axes of the positioning machine 4 (axes X, Y, Z) represented on FIG. 1, and from the angular positions of the probe according to the angles α,θ of rotation shown in FIG. 4. Such parameters of the positioning machine 4 and of the angular position of the probe are provided by appropriate encoders, and sampled by the controller of the positioning machines, which converts them into absolute coordinates of points of the surface along the scanning path, and stores the result. The determination can also take into account several additional parameters and correction factors, like for example probe deflection, deformations of the CMM, calibration data and so on, as it is known in the art.

Figure 6:
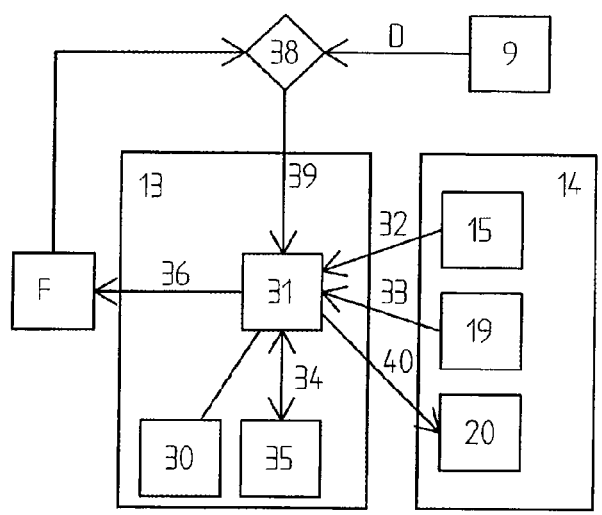
FIG. 6 shows a state diagram of the contact force adjustment process according to one aspect of the invention.

The orientation of the stylus 2 in any direction (α,θ) provides a greater scanning flexibility since it allows scanning without losing the contact with a workpiece having a multiple angled surface 1 while the probe head 25 simply moves along a rectilinear trajectory 17. Furthermore, the inertia effects are minimized in taking a light weight stylus 2, as opposed to its heavy weight support 3. The absolute coordinates of the probe tip 10 moves along the scanning path 18 that is made up by all contact points between the probe tip 10 and the surface 1. In a preferred embodiment of the invention, the absolute coordinates 20 are stored in memory means 14 as illustrated in FIG. 6.

As a result, the apparatus according to the invention allows for high speed continuous scanning by moving the machine 4 at relatively high but constant velocity along a line 13 over the surface of the workpiece while simultaneously operating the driving means 5, 7 to rotate the head, for example in an oscillating movement transversal to the movement of the support 3, so that the scanning path is sinusoidal as in FIG. 2. It is yet also possible to scan bores or cylindrical surfaces by driving the support 3 in a rectilinear motion and the probe head along a circular motion, so that the scanning path 18 of the probe tip 10 is a spiral.

The goal of the invention beside enabling flexible high speed scanning for different types of surfaces and minimizing the inertia effects is to provide a sharper precision on the coordinate measurement thanks to the elimination of the bending forces applied to the probe 2. Those bending forces, which are derived from the torques applied by the driving means 5, 7 may on one hand produce vibrations on the machine 4 and deteriorate it; on the other hand, those forces tend to deflect the stylus making up the probe 2 from its straight form, so that the coordinates measured may be incorrect if the forces applied are too high and cause the bending of the probe 2.

Figure 5:
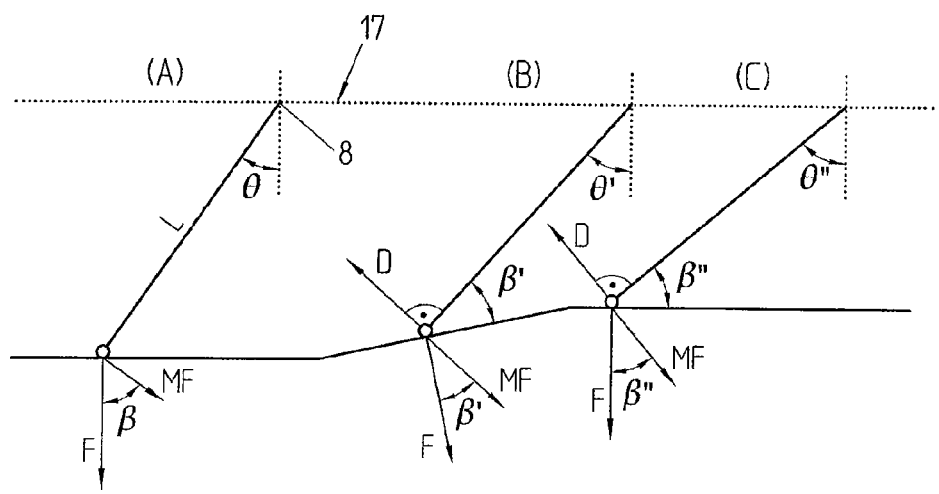
FIG. 5 shows the evolution of the contact force along a scanning path.

FIG. 5 shows how the contact force F can evolve over the scanning path 18 when the surface to scan 1 spans the three dimensions of space and the trajectory 17 of the support is rectilinear in the (x, y) plane. Actually FIG. 5 is a section according to a vertical plane containing the path 17, hence showing only one component of the contact force F, but the same reasoning would apply to a section according to a generic plane.

In a first position (A) of the support and respectively the centre of the associated Galilean reference system, the angular position of the probe 2 is θ and the force derived from the torque of the second drive means 7 is MF. This force MF is applied on the workpiece's surface by the tip of the probe 10 according to a direction normal to the probe 2 and is equal and opposed to the force (not drawn) exerted by the workpiece on the probe's tip. In the approximation that other external forces, for example friction forces or inertia forces, are negligible, the contact force F normal to the surface 1 is obtained by imposing that the moment of force F with respect to the axis 8 is equal to the torque M of the second drive means 7.

Seeing that the force MF is equal to M/cos(β), where M represents the torque, β the angle between the probe 2 and the plane tangent to the surface 1, and l the length of the probe, the contact force F is then given by $$F=MF/\cos(\beta), \qquad (1)$$

In a second position (B) of the support and respectively the centre of the associated Galilean reference system, the angular position of the probe 2 is θ' and the force derived from the torque of the second drive means 7 is still MF, and this force is always applied on the tip of the probe 10 according to a direction normal to the probe 2. However, the angle β' between the probe 2 and the plane tangent to the surface 1 is now different than in position A. In this case, the contact force F is now proportional to the force MF with a different factor cos(β'). Importantly, since the probe is scanning an inclined part of the workpiece, not parallel to the path 17 of the support, the angle β' is not constant, but varies as the scanned point rises, and the ratio between forces F and MF varies according to cos(β').

In a third position (C) of the support and respectively the centre of the associated Galilean reference system, the angular position of the probe 2 is now θ" and the angle β" between the probe 2 and the plane tangent to the surface 1 is again different. The ratio between F and MF, still equal to cos(β"), changes accordingly.

An aim of the invention is to keep the contact force F constant within a predetermined range of values 15, and preferably to a constant value that the deflecting forces are maintained at a low level and can properly be accounted for. Therefore, the torque of the drive means 7 must be adapted to the projection angles β, β', β". This can be performed in a "static" manner for plane surfaces when the angle for the projection is constant, as in the case of positions (A) and (C), or by calculating the required torque in real-time, by means of formula (1).

Similarly the same reasoning could be applied to for the other angular degree of freedom of the probe 23 with the angle α. As a result, the torques of the drive means 5, 7 are adapted by scanning a surface 1 in three dimensions by applying known geometric methods and, if appropriate, by including appropriate approximation for other external forces, for example friction forces and inertia forces. This adaptation is performed by control means 13 which are coupled to the drive means 5, 7. In a preferred embodiment of the invention, the control means 13 adjust an input voltage or current that is fed to the motors 5, 7 which produce the desired torques according to the provided input.

In general the angle β cannot be derived only from the angular positions (α,θ), but a certain prior knowledge of the surface is required. Therefore, a theoretical profile 19 for the surface can be loaded into memory means 14 to determine this angle β for each contact point along the scanning path 14. This theoretical profile 19 is consulted by the control means 13 in order to perform the adjustment instantaneously for each coordinates 20 along the scanning path 18.

As a result of this adjustment process, the resultant contact force F is always supposed to have a constant magnitude and to always act normally. This is desirable because the probe is subject to deformation when urged too strongly against the surface, and a variation of the bending of the probe 2 cannot be calibrated to estimate the measurement errors they induce. Moreover, this adjustment process allows following more smoothly the surface without breaks or jumps that would damage the probe and cause unwanted vibrations of the whole system.

FIG. 6 illustrates the adjustment process carried out by the control means 13. Preferably the control means 13 consist in a computer processing an execution program 31 according to a theoretical profile 19 loaded in the memory means 14. Many such profiles 19 can be dynamically loaded (arrow 33) in the memory means 14. The execution program 31 can derive the respective projection angles β1,β2 from the corresponding to the angular positions (α,θ), and in turn the control means 13 derive the torques M1 and M2 as respective cosine functions of β1 and β2. It outputs thus the desired constant contact force 11, as shown by arrow 36. The calibration 34 is done prior to the actuation of the driving means 5, 7 either in a standalone mode by placing the probe tip 10 in a predetermined position for which all the necessary parameters 35 to compute the magnitude of the contact force F are known (i.e. M1,M2,β1, β2), whereby the range of values 15 for the magnitude of the force are also dynamically loaded (arrow 32). In a variant embodiment of the invention, the calibration 34 is performed with the help of the second range of values 16 and the feedback of the contact force detecting means 9. The detecting means 9 are preferably a strain gauge measuring the deflection force D, also referred to as bending force, applied to the probe tip 10 in the three directions of space (e.g. x, y, z). Other force measuring means are however possible and included in the scope of the present invention. The contact force detecting means could include, among others, an optical deflection detectors, a magnetic deflection detector, a piezoelectric force detector, an inductive force detector, or any other appropriate force detection means.

According to one variant of the present invention, the contact force detection is performed indirectly by evaluation of the movements and/or of the linear forces and torques generated by the actuators of the CMM and of the measuring head.

It can be noted however that the deflection force D is not necessarily always equal to the contact force F. A simple example to illustrate this difference between the two forces is to consider the positions of FIG. 5 (A), (B), (C) and assume that the probe tip is not moving. In this case, since the probe tip 10 is not moving, the sum of the forces applied to the tip, which makes up the deflection forces, is the exact opposite of the forces that the tip 10 applies to the surface 1. Therefore when comparing the magnitudes of the contact force F and the deflection force D, reverse corrections taking into account the projection angle β must be carried out. When the probe 2 is moving, possibly further cinematic corrections can be considered as mentioned further in this document. In any case, the range of values 15 set for the contact force F must be adjusted and transposed to another range of values 16 in order to be applied to the deflection force D. Since the bending of the probe 2 induced by the deflecting force D may not be the same in all directions, it is however possible to choose those range of values 15, 16 equal as long as they are both close to zero. The goal of those range of values being to ensure that both forces F, D are themselves very weak, the requirements in terms of precision for the measurement would be met in taking such range of values.

According to the diagram of FIG. 6, it can be noted that the contact force detecting means 9 can be used for other purposes than just calibration 34. The detecting means 9 are preferably also used as a feedback tool determining whether the tip of the probe 10 actually follows a surface 1 whose profile corresponds indeed to the theoretical profile 19 stored in the memory means 14. The adjusted torques of both drive means 6, 8 output a contact force F which is transposed (arrow 37) and then compared (square 38) to the value of the actual deflection force D determined by the strain gauge 9. In case of discrepancy between the deflection force D and this transposed value of the contact force F, which are supposedly identical, it means that the actual scanning path 18 is not the path planned. As a result the foreseen adjustment will not match the requirements to keep the contact force F constant and both its magnitude and its direction will go out of control if no additional feature is foreseen for such cases.

According to a preferred embodiment of the invention, the control means 13 can therefore work in dual modes, either an adjustment mode 41 or a correction mode 42. The adjustment mode 41 corresponds to a mere verification that the surface scanned 1 corresponds to the theoretical profile 19, whereas the correction mode 42 allows to adapt the torques of the driving means 5, 7 and the trajectory 17 of the probe head so that the deflection force D measured by the strain gauge returns to a predefined range of values 16 set for it, this set of values being preferably correlated to the range of values 15 defined for the contact force F, and accordingly close to zero or at least not too high. The feedback from the strain gauge 9 to the program sets its execution mode depending on the result of the comparison 38 between the theoretical contact force (the output of the two adjusted torques) and the deflection force D measured by the strain gauge 9. This dual mode setting is illustrated by the arrow 39 as a feedback to the program 31, while the switching between modes is explained in more detail further in this document by FIG. 7.

During the correction mode 41, the deflection force D applied to the probe 2 is kept constant and similar to the ones applied over the regular scanning path 18, i.e. maintained at a low value. This way, the joint measurement and storing process illustrated by the arrow 40 on FIG. 6 can be continued irrespective of the mode (i.e. adjustment or correction). Since the mode switching does not induce a loss of accuracy due to an inappropriate bending of the probe, the actual coordinate values 20 can be measured continuously or sampled during the correction process as well so that they can be compared to the expected original values.

In a variant embodiment of the invention, the coordinates 20 are only measured and stored in the memory means 14 as long as the deflection force D measured by the detecting means 14 remains within said range of values 16. The program can further contain the step of registering when the contact force F outside the range of values 15 (and accordingly that the deflecting force D is outside the range of values 16) and also the step of notifying it (e.g. with an alarm sound) and stop the scanning process.

In variant embodiments of the invention, there can be other functionalities associated with the unfolding of the execution program 31, like the setting of all the necessary parameters to compute the magnitude of the contact force F (i.e. M1,M2, β1,β2) as a sole function of the time. To this end, a relation between the angular velocities ω1 and ω2 (not shown in FIG. 6) and the torques M1, M2 must also be defined; it can be for example a linear relationship. However, the fact to include the time as a parameter (the dotted box with reference 30 in FIG. 6) for the execution of the program does not exclude the possibility to use the other parameters used otherwise. The use of the time parameter 30 can for example allow to carry out cinematic corrections when the value and the direction of the acceleration is known for each point of contact along the scanning path 18. These cinematic corrections can be useful for a very accurate determination of the deflecting force D estimated by the detecting means 9 all along the scanning path 18, especially if variations of at least one of the angular velocities ω1 or ω2 are high (e.g. in case of a high speed continuous scanning with oscillatory movements of the probe 2).

Although it is possible to take into account such cinematic corrections, those corrections cannot be made in the correction mode 42 since the acceleration is not known a priori in this mode. A good approximation for this mode is to consider that the sum of the forces applied to the tip of the probe 10 is the opposite of the forces applied to it. Indeed, the tip of the probe itself 10 makes up a non-galilean reference system in which there is no movement. Therefore in this referential system the sum of the forces is equal to the sum of the inertia forces that are given by the forces' composition theorem (yielding among others the values for the Coriolis force etc.). If we neglect those inertia forces by considering that both the weight of the probe and the accelerations of the tip of the probe 10 with respect to the point 24 on the support 3 are small enough, we indeed obtain that the magnitude of this bending force measured by the strain gauge is a linear function of the square root of the sum of the squares of the drive means 5, 7 torques. In other words, we want to constrain the square of the torques $M1^2+M2^2$ to a constant value. The well known formula $Cos^2\phi+Sin^2\phi=1$ fulfills those requirements, so that the torques can be adjusted in the correction mode 42 as complementary sinusoidal functions of an arbitrary angle $\phi$ (M1=$M_o$ Cos$\phi$ and M2=$M_o$ sin$\phi$, or vice versa, where the reference magnitude $M_o$ and the angle $\phi$ can be set for example during the calibration process to fit in with the original requirements for the magnitude of the contact force F).

Figure 7:
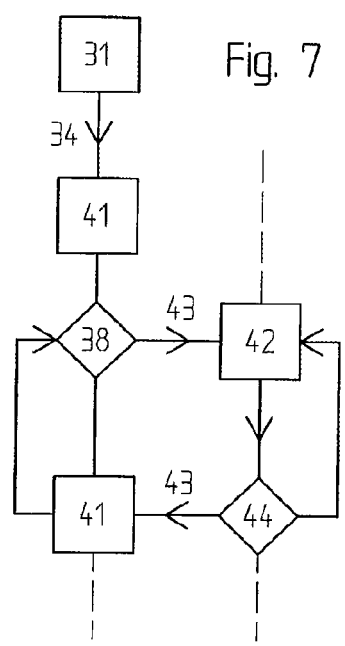
FIG. 7 shows a state diagram explaining a dual mode functioning according to one aspect of the invention.

The switching between the correction mode 42 back to the adjustment mode 41 can be done e.g. when the execution program 31 run by the control means 13 determines than a measurement value for the coordinates 20 matches theoretical coordinates comprised within the theoretical scanning path, whereby even in the correction mode 42, the scanning is continued according to the predefined trajectory for the support 17 and hence following virtually the theoretical scanning path. The state diagrams of FIG. 7 shows how this dual mode operation works, and especially how and when the switching between modes 43 is performed. When the scanning execution program 31 is run, it first starts with the calibration operation 34 and then enters goes on in the so-called adjustment mode 41. If the deflecting force 12 measured by the strain gauge and the transposed value of the contact force F are not identical, the execution programs 31 switches the mode (arrow 43) and continues to scan in the correction mode 42 until it finds a match 44 between the measured coordinates 20 and coordinates belonging to the theoretical profile 19. At this moment it switches back (arrow 43) to the adjustment mode 41.

In another preferred embodiment of the invention (not shown), it would also be possible to switch the mode as soon as the value of the deflecting force D exceeds a boundary set in the second range of values 16. In this case, the step 38 of comparing the transposed value for the contact force with the value of the deflecting force D would just be replaced by a match query between the actual value of the deflecting force D measured by the strain gauge 9 and the range of values 16 set for the deflecting force. Accordingly the correction mode 42 would bring the measured deflecting force D back within said second range of values 16 and continue the scanning until finding a coordinate match 44.

Although it is referred most of the time to a continuous scanning process in this document, discrete scanning is also possible, either as a functionality implemented in the execution program, where the sampling is a function of time 30 while the scanning performed still involves continuous movements of the probe 2, or with stop and go movements of the probe 2, whereby the probe stops on predefined positions.

The invention claimed is:

1. A method for scanning a surface of a workpiece using a scanning probe mounted on a support on a coordinate measuring machine, said support containing one or more drive actuators for actuating the movement of said scanning probe relatively to said support, a control unit coupled to the drive actuators, and a memory for storing theoretical profiles and coordinates of said surface, said method comprising the steps of:
  (i) determining a first range of values for a contact force applied between the tip of said scanning probe and said surface;
  (ii) operating said drive actuators to position said tip in contact with said surface;
  (iii) operating said coordinate measuring machine to move the support along a determined trajectory; and
  (iv) operating said drive actuators to produce, simultaneously with the relative movement of the support with respect to the surface, movements of said scanning probe relative to the support;

whereby said control unit adjust the actuation of the drive actuators along a scanning path in order to maintain said contact force within said first range of values during the whole scanning operation along said scanning path.

2. The method of claim 1, further comprising the initial step of
   (i) loading said theoretical profile of said surface to scan into said memory;
   whereby said control unit perform the adjustment of the actuation of said drive actuators along said path according to said theoretical profile.

3. The method of claim 2, wherein said coordinate measuring machine further comprises a contact force sensor to measure the contact force applied between the tip of said probe and said surface, and/or a deflecting force component of said contact force, whereby said control unit adjust the actuation of the drive actuators according to an output of said contact force sensor, in order to maintain said contact force within said first range of values during the whole scanning operation along said scanning path.

4. The method of claim 2, whereby the drive actuators are motors whose torques are adjusted according to an angular position of said probe and/or the position of said probe with respect to the surface, according to said theoretical profile.

5. The method of claim 4, whereby said torques of said motors are derived from an input voltage or current.

6. The method of any one of the preceding claims further comprising the step of storing all the instantaneous coordinates along said path in the memory.

7. The method of claim 6, whereby said step of storing all the instantaneous coordinates along said path in the memory is only performed as long as the deflecting force measured by said force sensor remains within a second range of values associated with said first range of values defined for the contact force.

8. The method of claim 3, further comprising the step of modifying said determined trajectory when the deflecting force according to said force sensor is outside a second range of values.

9. The method of claim 3, whereby a measurement of the deflecting force by said force sensor involves cinematic corrections.

10. The method of claim 1, further comprising a step of real-time correction to bring the measured deflecting force back within a second range of values.

11. The method of claim 1, wherein said coordinate measuring machine and said support comprise encoders providing positioning data of the axes of coordinate measuring machine and said support, the method further comprising a step of sampling said position data of said axes and a step of calculating coordinates of said surface along said scanning path, based on said position data.

12. A non-transient computer readable storage medium bearing instructions that are to be executed by a computerized control unit to control a position of a scanning probe during a scanning operation for scanning a surface of a workpiece, wherein, upon being executed, the instructions cause the control unit to perform a method comprising:
   (i) determining a first range of values for a contact force applied between a tip of said scanning probe and said surface;
   (ii) operating drive actuators to position said tip in contact with said surface;
   (iii) operating a coordinate measuring machine to move a support supporting said scanning probe along a determined trajectory relative to said surface; and
   (iv) operating said drive actuators to produce, simultaneously with the movement of the support with respect to the surface, movements of said scanning probe relative to the support;
   whereby said control unit adjusts the operating of the drive actuators along a scanning path in order to maintain said contact force within said first range of values during an entirety of the scanning operation along said scanning path.

* * * * *